(12) United States Patent
McQueen

(10) Patent No.: US 9,710,686 B2
(45) Date of Patent: Jul. 18, 2017

(54) DATA COLLECTION SYSTEM AND METHOD THAT DETECT ELECTRONIC DEVICE DISPLAYS VIA FRESNEL PATTERNS

(71) Applicant: Datalogic ADC, Inc., Eugene, OR (US)

(72) Inventor: Alexander M. McQueen, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 0 days.

(21) Appl. No.: 14/871,542

(22) Filed: Sep. 30, 2015

(65) Prior Publication Data

US 2017/0091503 A1    Mar. 30, 2017

(51) Int. Cl.
G06F 17/00 (2006.01)
G06K 7/14 (2006.01)
G06K 7/10 (2006.01)

(52) U.S. Cl.
CPC ....... G06K 7/1413 (2013.01); G06K 7/10722 (2013.01)

(58) Field of Classification Search
CPC .. G06Q 30/02; G07F 7/1008; G06K 7/10881; G06K 7/10851; G06K 7/10732; G06K 7/10722
USPC ................. 235/375, 462.2, 462.42
See application file for complete search history.

(56) References Cited

U.S. PATENT DOCUMENTS

| | | | |
|---|---|---|---|
| 6,749,120 B2 | 6/2004 | Hung et al. | |
| 6,877,663 B2 | 4/2005 | Kelly et al. | |
| 7,131,587 B2 | 11/2006 | He et al. | |
| 7,748,629 B2 | 7/2010 | Brock | |
| 8,322,621 B2 | 12/2012 | Olmstead | |
| 8,459,556 B2 | 6/2013 | Zhou | |

(Continued)

FOREIGN PATENT DOCUMENTS

| WO | 2012/117283 A1 | 9/2012 |
|---|---|---|
| WO | 2015/079461 A1 | 6/2015 |

OTHER PUBLICATIONS

Chakrabarti et al., "Focused crawling: a new approach to topic-specific Web resource discovery,", *Computer Networks* 31(11-16):1623-1640, 1999.

(Continued)

*Primary Examiner* — Karl D Frech
(74) *Attorney, Agent, or Firm* — Seed IP Law Group LLP

(57) ABSTRACT

A control subsystem determines based on the characteristics of light from a secondary illumination source reflected off optics of a data collection device whether a display screen of an electronic device (e.g., smartphone, smartwatch, tablet computer) are in a field of view of the data collection device, and switches operational modes accordingly. Thus, the control subsystem can employ a Fresnel pattern for such determination. The data collection device can operate in a diffuse reading mode, characterized by active illumination and/or relatively fast exposure times. The data collection device can operate in a reflective reading mode, characterized by a lack of active illumination and/or relatively slow exposure times. Characteristics can include the number of reflections versus a number of air-substrate interfaces and/or a relative intensity of the reflections produced by successive air-substrate interfaces in a path of the light.

32 Claims, 8 Drawing Sheets

(56) References Cited

U.S. PATENT DOCUMENTS

| | | |
|---|---|---|
| 8,488,210 B2 | 7/2013 | Smith |
| 8,857,719 B2 | 10/2014 | Liu et al. |
| 8,991,100 B2 | 3/2015 | Van Camp et al. |
| 9,058,531 B2 | 6/2015 | Slutsky |
| 2002/0117547 A1* | 8/2002 | Krichever .......... G06K 7/10811 235/462.01 |
| 2006/0163355 A1 | 7/2006 | Olmstead et al. |
| 2012/0000982 A1 | 1/2012 | Gao et al. |

OTHER PUBLICATIONS

International Search Report and Written Opinion, issued Aug. 25, 2014 for corresponding International Application No. PCT/IT2013/000332, 9 pages.

Lusher et al., "A Relational Hyperlink Analysis of an Online Social Movement," *Journal of Social Structure* 12(5), 2011, 36 pages.

Newman, "The structure and function of complex networks," *SIAM Rev.* 45(2):167-256, 2003.

Rogers, "Issue Mapping Contextual Essay," Issue Crawler Web Network Mapping Software and Allied Tools, 2007, 7 pages.

Wong et al., "Design of a Crawler for Online Social Networks Analysis," *WSEAS Transactions on Communications* 13:263-274, 2014.

International Search Report, mailed Jan. 17, 2017 for corresponding International Application No. PCT/US2016/054755, 4 pages.

Written Opinion, mailed Jan. 17, 2017 for corresponding International Application No. PCT/US2016/054755, 5 pages.

* cited by examiner

DATA COLLECTION SYSTEM AND METHOD THAT DETECT ELECTRONIC DEVICE DISPLAYS VIA FRESNEL PATTERNS

BACKGROUND

Technical Field

The present disclosure relates to readers to read machine-readable symbols.

Description of the Related Art

Machine-readable symbols encode information in a form that can be optically read via an appropriately configured machine-readable symbol reader or scanner. Machine-readable symbols take a variety of forms, the most commonly recognized form being the linear or one-dimensional barcode symbol. Other forms include two-dimensional machine-readable symbols such as stacked code symbols, and area or matrix code symbols. These machine-readable symbols are typically composed of patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, may include more than two colors (e.g., more than black and white), may comprise directly marked materials having the symbols formed in surface relief, and/or may comprise electronic media displayed by an illuminated screen or display of an electronic device such as a cell phone.

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EAN), Code 39, Code 128, Data Matrix, PDF417, etc.

Machine-readable symbols have widespread and varied applications. For example, machine-readable symbols can be used to identify a class of objects (e.g., merchandise) or unique items (e.g., patents). As a result, machine-readable symbols are found on a wide variety of objects, such as retail goods, company assets, and documents, and help track production at manufacturing facilities and inventory at stores (e.g., by scanning items as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a data reader to allow the customer to redeem a coupon or to verify that the customer has purchased a ticket for the event.

Machine-readable symbol readers or data readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relatively narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Reading a symbol typically employs generating an electrical signal having an amplitude determined by the intensity of the collected light. Relatively less reflective or darker regions (e.g., bars or other marks) may, for example, be characterized or represented in the electrical signal by an amplitude below a threshold amplitude, while relatively more reflective or lighter regions (e.g., white spaces) may be characterized or represented in the electrical signal by an amplitude above the threshold amplitude. When the machine-readable symbol is imaged, positive-going and negative-going transitions in the electrical signal occur, signifying transitions between darker regions and lighter regions. Techniques may be used for detecting edges of darker regions and lighter regions by detecting the transitions of the electrical signal. Techniques may also be used to determine the dimensions (e.g., width) of darker regions and lighter regions based on the relative location of the detected edges and decoding the information represented by the machine-readable symbol.

In machine-readable symbol readers, a return light signal from the object or symbol being read is focused onto a sensor or sensor array. In the example of a machine-readable symbol reader reading marks and spaces of a typical machine-readable symbol, there needs to be sufficient difference in signal intensity between the signal corresponding to the light space and the signal corresponding to the dark bar in order for the processor to differentiate therebetween. Given the variety of types of machine-readable symbols in use and the variety of types of media or materials on which they can be used or displayed, it can be difficult to create a single set of conditions (such as through illumination, aperture, acquisition speed or shutter speed) suitable for general use. For example, in some instances a machine-readable symbol reader reads machine-readable symbols printed on a piece of media, e.g., paper, card board, metal. The media can have various surface characteristics from generally specularly diffusive (e.g., untreated or uncoated paper or cardboard) to generally specularly reflective (e.g., aluminum cans, reflective packaging such a metallic Mylar packaging, coated paper or coated cardboard). In other instances, a machine-readable symbol reader reads machine-readable symbols printed on a display screen of an electronic device (e.g., tablet computer, smartphone, smartwatch, personal digital assistant, electronic reader or book).

BRIEF SUMMARY

The described data collection methods and data collection systems allow efficient use of digital imaging resources to maximize performance of optical code or symbol reading on non-electronic media (e.g., diffuse reflection optical codes or symbols) by reliably detecting a presence or absence of a glass display of an electronic device (e.g., tablet computers, smartphones, smartwatches, personal digital assistants, electronic readers). This allows the data collection system (e.g., machine-readable symbol reader) to only switch from a higher throughput performance mode (i.e., diffuse reading mode) to a lower throughput performance mode (i.e., reflective reading mode) for reading from the display screen of the electronic device when such a display screen is actually present in a field of view of the data collection system.

Typically, digital imaging data collection systems (e.g., machine-readable symbol readers) read mainly diffusely reflecting codes or symbols printed on labels or directly on objects (e.g., retail item packaging). When used in this diffuse reading mode, the data collection system provides active illumination (e.g., strobed illumination) from a primary illumination source, coupled with a short imager exposure time to eliminate motion blur. This mode allows the data collection system to read codes or symbols on items moving at high speed.

Unfortunately, in order to read optical codes or symbols presented via display screens of electronic devices such as those used in cell phones or electronic tablets, the optimum exposure conditions are not compatible with those of the diffuse reading mode. When reading from a display screen, the illumination provided by the data collection system does not improve the contrast of the self-illuminated display screen, and may actually "blind" the imager if the surface of the display screen is tilted to reflect the illumination directly back into the imager (specular reflection). The primary illumination source should be turned OFF to avoid this condition. Turning OFF the active illuminating means that the illumination emitted by the display screen is the source of light to be captured by the imager. This level of illumination provided by a display screen is usually much less than that produced by the primary illumination source of the data collection system. Consequently, the exposure time of the imager must be significantly lengthened in order to capture a usable image. Increasing the exposure time means that fewer image frames per second are available for decode, limiting overall throughput of the data collection system.

If the data collection system simply automatically alternates between the two operational modes (i.e., diffuse reading mode, reflective reading mode), then normal diffuse code or symbol reading is reduced significantly by the percentage of time the data collection system is in the incorrect mode for reading this type of diffuse medium.

An alternative method that might be used to avoid this problem is to look for bright image areas which are the result of specular reflections from the display screen of an electronic device. This method is fraught with problems, as there are many specularly reflective retail packages (e.g., plastic bags, metal cans, coated cardboard, coated paper) which create bright areas in an image, but which do not correspond to the presence of a display screen of an electronic device. Such an approach would tend to falsely force the data collection system into the long exposure, low-throughput mode too often, thereby significantly reducing data collection system performance.

The approach described herein maximizes performance of the data collection system, while allowing improved reading of information presented on display screens of electronic devices without adding any substantial hardware or product cost.

The presently described approach utilizes detection of a reflected image of an illumination source (e.g., secondary illumination source), rather than just a nondescript area of high brightness in an image, to determine if there is an display screen of an electronic device present in the field of view of the data collection system. This is possible due to three factors:

1. The front surface of most display screens of electronic devices are relatively high quality, relatively flat glass or other dielectric material.

2. Flat optical materials allow preservation of high quality images upon reflection, acting as a form of mirror.

3. Reflection from typical dielectric materials provides a predictable brightness of the reflected image.

As an electromagnetic wave passes from a medium of one refractive index to a medium of a different refractive index that there will be some amount of average power transmitted and some reflected. This is evident if one looks at a pane of glass held normal to one's line of sight. The faint reflected image is known as a 'Fresnel reflection', named for Augustin-Jean Fresnel who developed the theory and equations which describe this phenomenon. The average amount of optical power which is transmitted and reflected at such an interface is determined (ignoring interference effects) by the refractive indices on either side of the interface and the polarization of the light. For unpolarized white light, the average amount reflected by one air-glass interface is about four percent.

Typical optical code or symbol readers have a window with one or more glass or plastic optics to protect the internal parts of the data collection system. A dim probe light source (e.g., secondary illumination source) can be located inside a housing of a data collection system, positioned and oriented such that its reflection from the various optics is captured by an imager of the data collection system. One or more processor can analyze the reflection images using rudimentary image processing.

If no item is placed on an outermost optic of the window of the data collection system, the imager will only detect a dark field with faint probe source reflections. If a typical retail item having diffuse or specularly reflecting material properties is placed on outermost optic of the window of the data collection system, in almost all cases the item will not be sufficiently flat to produce a reflected image of the probe source. Additionally, if the data collection system is in a high-throughput, short exposure mode (i.e., diffuse reading mode), the intense illumination provided by the data collection system, reflected from the mainly diffuse item, will obliterate any image reflections of the weaker probe source. However, if a relatively optically flat dielectric item, such as a piece of glass or an display screen of an electronic device is placed on the outer window, then a new image of the probe source will appear in the mostly dark field, and presence of the display screen detected.

A data collection system may be summarized as including a barrier having an outer side, an inner side, and at least one window, the inner side of the barrier opposed across a thickness of the barrier from the outer side of the barrier, and the at least one window having at least one optic that is transparent or at least translucent and which allows light to pass through the window between the outer and the inner sides of the barrier; at least a first imager, the first imager positioned to the inner side of the barrier to receive light that passes through the at least one window from the outer side of the barrier via the at least one optic; at least one primary illumination source positioned on the inner side of the barrier and oriented to pass light through the at least one window via the at least one optic without directly passing light to the first imager and substantially without reflection to the first imager from the at least one optic; at least one secondary illumination source positioned on the inner side of the barrier and oriented to direct light toward the at least one optic with partial reflection from the at least one optic to the first imager; and a control subsystem including at least one processor, the control subsystem communicatively coupled to the imager and communicatively coupled and operable to control at least one of: the at least one primary illumination source or exposure time of the first imager responsive to at least one characteristic of a number of reflections by at least one optic of light from the at least one secondary illumination source. The at least one optic may include a first transparent substrate. The control subsystem may determine whether the imager detects two N reflections, where N may be equal to a total number of optics between the secondary illumination source and the outer side of the barrier.

In response to determining that there are more than two N reflections detected, the control subsystem may cause the primary illumination source to at least temporarily stop providing illumination. In response to determining that there are more than two N reflections detected, the control subsystem may at least temporarily cause an increase in exposure time. In response to determining that there are more than two N reflections detected, the control subsystem may cause the primary illumination source to at least temporarily stop providing illumination and at least temporarily causes an increase in exposure time. The control subsystem may determine whether an intensity of a reflection associated with an outermost surface of an outermost one of the optics is approximately 1.8 times an intensity of a reflection associated with an innermost surface of the outermost one of the optics. The at least one optic may include a second transparent substrate. The control subsystem may determine whether an intensity of reflections from an inner one of the first or the second transparent substrates and an outer one of the first or the second transparent substrates decreases monotonically. The control subsystem may determine whether an intensity of reflections from each of a plurality of air-substrate interfaces decreases monotonically from an innermost one of the air-substrate interfaces to an outermost one of the air-substrate interfaces. The first transparent substrate may be a plastic transparent substrate and the second transparent substrate is a glass transparent substrate. The plastic transparent substrate may be spaced inwardly of the glass transparent substrate. The glass transparent substrate may include a protective coating on an outer portion thereof. The control subsystem may determine whether an intensity of a reflection associated with the outer portion of the glass transparent substrate is approximately 1.8 an intensity of a reflection associated with an inner portion of the glass transparent substrate.

The control subsystem may further determine whether an intensity of a number of reflections associated with the plastic transparent substrate and the inner portion of the glass transparent substrate decrease by monotonically from innermost to outermost air-substrate interfaces of the plastic and glass transparent substrates.

In response to determining that the intensity of a reflection associated with the outer portion of the glass transparent substrate is approximately 1.8 times an intensity of a reflection associated with the inner portion of the glass transparent substrate, the control subsystem may cause the primary illumination source to at least temporarily stop providing illumination.

In response to determining that the intensity of a reflection associated with the outer portion of the glass transparent substrate is approximately 1.8 times an intensity of a reflection associated with the inner portion of the glass transparent substrate, the control subsystem may at least temporarily cause an increase in exposure time.

In response to determining that the intensity of a reflection associated with the outer portion of the glass transparent substrate is approximately 1.8 times an intensity of a reflection associated with the inner portion of the glass transparent substrate, the control subsystem may cause the primary illumination source to at least temporarily stop providing illumination and may at least temporarily cause an increase in exposure time. The secondary illumination source may include at least one light emitting diode and the primary illumination source comprises a strobe light source.

A method of operation in a data collection system that includes at least one optic between an interior and an exterior of the data collection system, an imager, at least one primary illumination source, at least one secondary illumination source, and control subsystem may be summarized as including detecting a number of reflections of the at least one secondary illumination source from the at least one optic; determining, by the control system, whether at least one characteristic of the detected reflections is indicative of a presence of a display screen of an electronic device in a field-of-view of the imager of the data collection system; and switching, by the control system, between a first operational mode of the data collection system and a second operational mode of the data collection system in response to a determination that the at least one characteristic of the detected reflections is indicative of a presence of a display screen of an electronic device in the field-of-view of the imager of the data collection system. Determining whether at least one characteristic of the detected reflections is indicative of a presence of a display screen of an electronic device in a field-of-view of the imager of the data collection system may include determining whether the imager detects two N reflections, where N is equal to a total number of optics between the secondary illumination source and the outer side of the barrier. Switching between a first operational mode of the data collection system and a second operational mode of the data collection system may include causing the primary illumination source to at least temporarily stop providing illumination. Switching between a first operational mode of the data collection system and a second operational mode of the data collection system may include at least temporarily causing an increase in exposure time. Switching between a first operational mode of the data collection system and a second operational mode of the data collection system may include causing the primary illumination source to at least temporarily stop providing illumination and at least temporarily causing an increase in exposure time. Determining whether at least one characteristic of the detected reflections is indicative of a presence of a display screen of an electronic device in a field-of-view of the imager of the data collection system may include determining whether an intensity of a reflection associated with an outermost surface of an outermost one of the optics is approximately 1.8 times an intensity of a reflection associated with an innermost surface of the outermost one of the optics. The at least one optic may include a second transparent substrate, and determining whether at least one characteristic of the detected reflections is indicative of a presence of a display screen of an electronic device in a field-of-view of the imager of the data collection system may include determining whether an intensity of reflections from an inner one of the first or the second transparent substrates and an outer one of the first or the second transparent substrates decreases monotonically.

The at least one optic may include a second transparent substrate, and determining whether at least one characteristic of the detected reflections is indicative of a presence of a display screen of an electronic device in a field-of-view of the imager of the data collection system may include determining whether an intensity of reflections from each of a plurality of air-substrate interfaces decreases monotonically from an innermost one of the air-substrate interfaces to an outermost one of the air-substrate interfaces. The at least one optic may include a second transparent substrate, the first transparent substrate may be a plastic transparent substrate and the second transparent substrate may be a glass transparent substrate, the plastic transparent substrate may be spaced inwardly of the glass transparent substrate, the glass transparent substrate may include a protective coating on an outer portion thereof, and determining whether at least one characteristic of the detected reflections is indicative of a presence of a display screen of an electronic device in a field-of-view of the imager of the data collection system may include determining whether an intensity of a reflection associated with the outer portion of the glass transparent substrate is approximately 1.8 times an intensity of a reflection associated with an inner portion of the glass transparent substrate.

Determining whether at least one characteristic of the detected reflections is indicative of a presence of a display screen of an electronic device in a field-of-view of the imager of the data collection system may further include determining whether an intensity of a number of reflections associated with the plastic transparent substrate and the inner portion of the glass transparent substrate decrease by monotonically from innermost to outermost air-substrate interfaces of the plastic and glass transparent substrates. Switching between a first operational mode of the data collection system and a second operational mode of the data collection system may include causing the primary illumination source to at least temporarily stop providing illumination.

Switching between a first operational mode of the data collection system and a second operational mode of the data collection system may include at least temporarily causing an increase in exposure time.

Switching between a first operational mode of the data collection system and a second operational mode of the data collection system may include causing the primary illumination source to at least temporarily stop providing illumination and at least temporarily causing an increase in exposure time.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The terms "illumination beam," "light," and "illumination" include visible, ultraviolet, and infrared light. The headings and Abstract of the Disclosure provided herein are for convenience only and do not limit the scope or meaning of the embodiments.

The technologies described herein can be used in machine-readable symbol readers, barcode scanners, optical imaging scanners, or for machine vision generally. These technologies can include wedge-shaped optical elements to provide grazing incidence illumination and improve mixed media reading and ergonomics of the readers or scanners.

Figure 1:
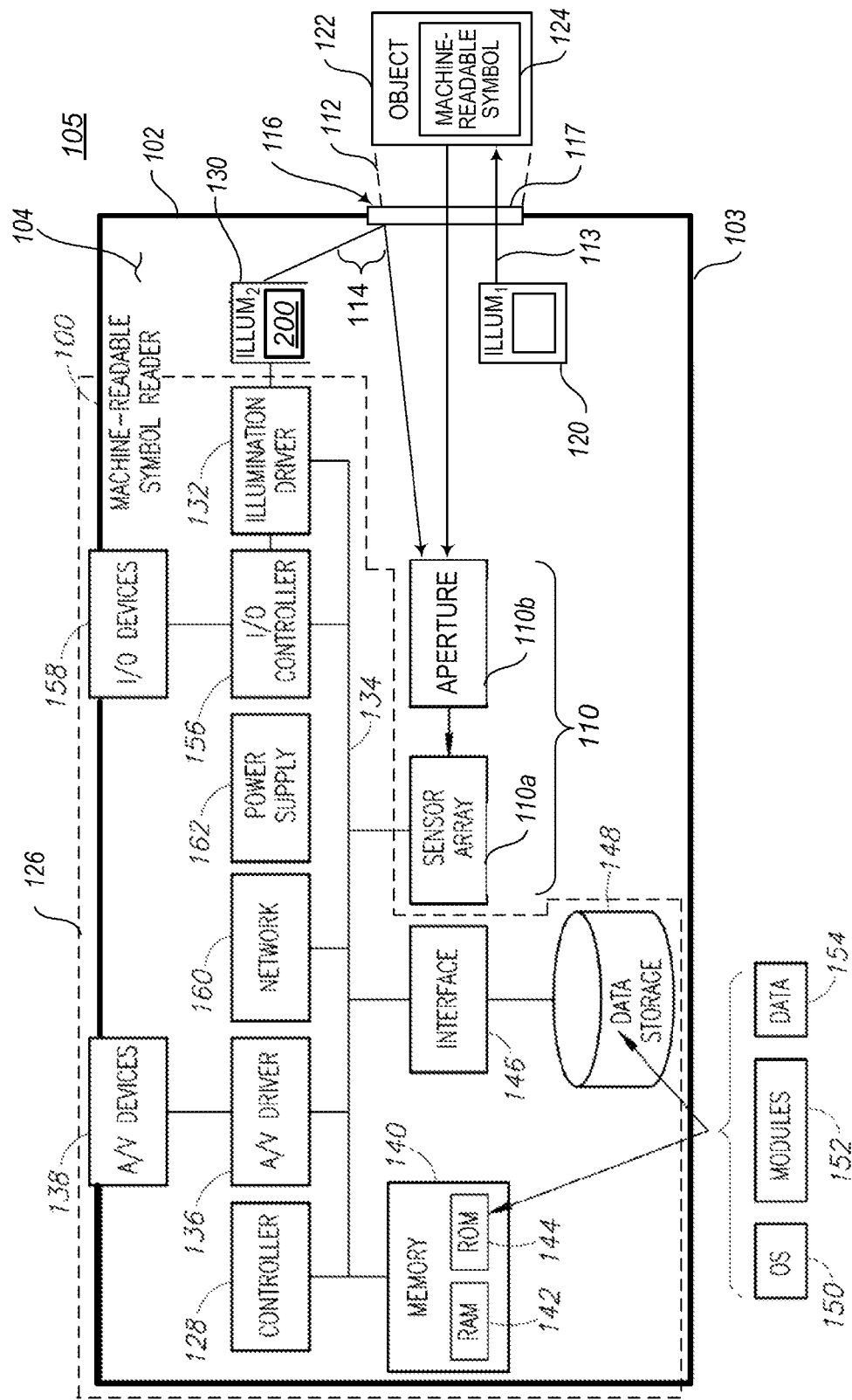
FIG. 1 is a block diagram of a data collection system in the form of a machine-readable symbol reader and an object bearing a machine-readable symbol to be read, according to at least one illustrated embodiment.

FIG. 1 shows a machine-readable symbol reader 100, according to one embodiment. The machine-readable symbol reader 100 includes an imager 110 which includes an image sensor or sensor array 110a and optionally an adjustable aperture 110b. The imager 110 can capture images of one or more fields of view such as field of view (broken lines) 112 through a window 116 in a barrier 102, which barrier 102 may form a portion of a housing 103. The imager 110 is located on an inner side 104 of the barrier 102, e.g., in the interior of the housing 103. Image frames captured by the sensor array 110 may include light emanating from outside the barrier 102, e.g., exterior 105 to the housing 103, in the field of view 112.

The window 116 includes one or more optics 117 which are transparent or at least translucent. For example, the optics 117 can include one or more transparent substrates, such as transparent plastic and/or transparent glass substrates, as described below in reference to FIGS. 2-6.

FIG. 1 also illustrates an item or object 122 positioned outside the barrier, e.g., exterior to the housing, within the field of view 112. The object 122 includes a machine-readable symbol 124 (e.g., PDF417, Code 128, etc.) that is to be detected and/or decoded by the machine-readable symbol reader 100.

The machine-readable symbol reader 100 includes at least one primary illumination source 120, which is operable to illuminate the field of view 112. The primary illumination source 120 can comprise any suitable source of light, such as one or more light emitting diodes (LEDs), flash strobes, incandescent or fluorescent lamps, or halogen bulbs. The primary illumination source 120 may generate light having one or more wavelengths. The primary illumination source 120 is positioned on the inner side 104 of the barrier 102, e.g., in the interior of the housing 103, and oriented to primarily pass light (arrow 113) through the window 116 via the at least one optic 117 without directly passing light to the imager 110 and substantially without reflection to the imager 110 from the at least one optic 117 of the window 116.

The machine-readable symbol reader 100 includes at least one secondary illumination source 130, which is operable to produce reflections from the optics 117 of the window 116. The secondary illumination source 130 can comprise any suitable source of light, preferably one or more light emitting diodes (LEDs), or alternatively one or more incandescent or fluorescent lamps, or halogen bulbs. The secondary illumination source 130 may generate light having one or more wavelengths. The secondary illumination source 130 is positioned on the inner side 104 of the barrier 102, e.g., in the interior of the housing 103, and oriented to at least partially reflect light (arrow 114) from various air-substrate interfaces of the optics 117 of the window 116 for detection of the reflected light 114 by the imager 110. For the typical case where the optics are glass and/or plastic, each reflection from an air-substrate interface will contain approximately four percent of the power of the incoming beam or light. Thus, with each reflection, the power returned is less than the previous reflection.

The sensor array 110 forms an electronic image of the field of view 112 and/or reflected light 114. The sensor array 110 may comprise a wide range of image sensing devices for converting an optical image (or another wavelength in the electromagnetic spectrum) into an electrical signal. For example, the sensor array 110 may comprise a digital sensor, such as a charge-coupled device (CCD) sensor array or complementary metal-oxide semiconductor (CMOS) sensor array, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale). After the sensor array 110 has been exposed to light emanating from field of view and/or reflected light 114, data from all the pixels can be sequentially read out in a selectable pattern (which may be row-by-row, sub-region by sub-region, or some other pattern). The pixel intensity data may optionally be converted to digital form using an analog-to-digital converter.

The machine-readable symbol reader 100 includes a control subsystem (enclosed by broken line polygon) 126 that controls operation of the various components of the machine-readable symbol reader 100, for example controlling operation of the imager 110, the primary illumination source 120 and secondary illumination source 130, for instance as described herein. The control subsystem can, for example include one or more of: a controller 128, illumination drivers or controllers 132, one or more non-transitory media, and other components, for instance as discussed herein.

In response to receiving an instruction from a controller 128, the sensor array 110 captures or acquires one or more images of the field of view 112 and/or reflected light 114. Conceptually, a read volume of the reader 100 includes a portion of space in front of the window 116 in which machine-readable symbols may be read (e.g., detected and decoded) by the machine-readable symbol reader 100. In other words, the read volume may be referred to as a view volume within which there is a relatively high probability of a successful scan/read.

One or more illumination drivers or controllers 132 are provided. The illumination driver 132 is communicatively coupled and operable to apply signals to drive the primary illumination source 120 to, for example, strobe the primary illumination source 120 at desired times or to light the illumination source 120 constantly for a period of time, to illuminate objects 122 in the field of view 112 or view volume. The illumination driver 132 is communicatively coupled and operable to apply signals to drive the secondary illumination source 130 to, for example, cause the secondary illumination source 130 to emit light to cause reflections from the air-substrate interfaces of the optics 117.

The sensor array 110 and the illumination driver 132 are communicatively coupled to the controller 128, which may be, for example, one or more of a processor, microprocessor, controller, microcontroller, digital signal processor (DSP), graphical processing unit (GPU) or the like (generally "processor"). Some implementations may include a dedicated machine-readable symbol scan engine or module as the controller 128. The communicative coupling may be via a bus 134 or other communication mechanism, such as direct connections of a serial, parallel, or other type. The controller 128 generally controls and coordinates the operation of other devices to which it is connected, such as one or more of the imager 110 (e.g., sensor array 110a, adjustable aperture 110b), the illumination driver 132, the primary illumination source(s) 120, and the secondary illumination source(s) 130.

As described herein, the control subsystem 126 or controller 128 can detect a presence or absence of an electronic display of an electronic device in the field of view 112, and in response switch between a first operational mode and a second operational mode. The control subsystem 126 or controller 128 can detect a presence or absence of an electronic display based on a pattern of reflected light, the light produced by the secondary illumination source(s) 130 and at least partially reflected at the various air-substrate interfaces of the optics 117 of the window 116. The control subsystem 126 or controller 128 can, for example, switch between a diffuse reading mode used to read information from diffuse objects or symbols and a reflective reading to read information from display screens of electronic devices, based on the determined presence or absence of the display screen. The diffuse reading mode can, for example employ active illumination, for instance strobed illumination to illuminate the field of view 112. In contrast, the reflective reading mode can turn off active illumination, relying on illumination from the display screen or ambient illumination. The diffuse reading mode can, for example employ a relatively short exposure time. In contrast, the reflective reading mode can a relatively long exposure time. The diffuse reading mode can, for example employ a relative small aperture, providing a relatively large depth of field. In contrast, the reflective reading mode can employ a relatively large aperture, providing a relatively small depth of field.

In some implementations, the control subsystem 126 or controller 128 can operate the machine-readable symbol reader 100 in the diffuse reading mode by default, entering the reflective reading mode in response to detection of a reflection pattern indicative of a display screen in the field of view 116. In some implementations, the control subsystem 126 or controller 128 can switch out of the reflective reading mode after each acquisition of a machine-readable symbol or after a defined time. Alternatively, in some implementations, the control subsystem 126 or controller 128 can switch out of the reflective reading mode in response to detection of an absence of a display screen or detection of the presence of a diffuse object 122 or diffuse symbol 124.

The controller 128 generally controls and coordinates the operation of an audio/visual (A/V) driver 136. The A/V driver 136 is optionally included to drive one or more audio devices 138, such as a buzzer, speaker, or other audible indicator, to produce an audible "beep" or other indication when a machine-readable symbol is successfully read. In addition, or alternatively, the A/V driver 136 may drive an LED or other visual indicator device 138 when a machine-readable symbol has been successfully read. Other devices or subsystems, such as a cash register or electronic scale, may also be connected to the controller 128. Moreover, the controller 128 and/or the bus 134 may interface with other controllers or computers, such as a cash register system or checkout terminal. Some implementations can include a user operable trigger or other switch, operation of which can cause the machine-readable symbol reader 100 to read machine-readable symbols.

The machine-readable symbol reader 100 also includes one or more non-transitory media, for example, memory 140, which may be implemented using one or more standard memory devices. The memory devices 140 may include, for instance, flash memory, RAM 142, ROM 144, and EEPROM devices, and the non-transitory media may also include magnetic or optical storage devices, such as hard disk drives, CD-ROM drives, and DVD-ROM drives. The machine-readable symbol reader 100 may also include an interface 146 coupled to an internal data storage 148, such as a hard disk drive, flash memory, an optical disk drive, or another memory or drive. The interface 146 may be configured for external drive implementations, such as over a USB or IEEE 1194 connection.

According to one implementation, any number of program modules are stored in the drives (e.g., data storage 148) and the memory 140, including an operating system (OS) 150, one or more application programs or modules 152, such as instructions to implement the methods described herein, and data 154. Any suitable operating system 150 may be employed. One of the program modules 152 may comprise a set of instructions to implement the methods for generating image data using the data reader 100. The data 154 may include one or more configuration settings or parameters, or may include image data from the sensor array 110 and decoded machine-readable symbol data.

The machine-readable symbol reader 100 may include a number of other components that interface with one another via the bus 134, including an input/output (I/O) controller 156 and one or more I/O devices 158, and a network interface 160. For example, the I/O controller 156 may implement a display controller and the I/O devices 158 may include a display device to present data, menus, and prompts, and otherwise communicate with the user via one or more display devices, such as a transmissive or reflective liquid crystal display (LCD) or other suitable display. For example, the I/O controller 156 and I/O device 158 may be operable to display a navigable menu system or graphical user interface (GUI) that allows the user to select the illumination and image capture settings.

The I/O controller 156 may receive user input from one or more input devices, such as a keyboard, a pointing device, or other wired/wireless input devices, that allow the user to, for example, configure the machine-readable symbol reader 100. Other input devices may be included, such as a microphone, touchscreen, touchpad, and trackball. While the input devices may be integrated into the machine-readable symbol reader 100 and coupled to the controller 128 via the I/O controller 156, input devices may also connect via other interfaces, such as a connector that includes one or more data interfaces, bus interfaces, wired or wireless network adapters, or modems for transmitting and receiving data. Accordingly, the I/O controller 156 may include one or more of hardware, software, and firmware to implement one or more protocols, such as stacked protocols along with corresponding layers. Thus, the I/O connector 156 may function as one or more of a serial port (e.g., RS232), a Universal Serial Bus (USB) port, or an IR interface. The I/O controller 156 may also support various wired, wireless, optical, and other communication standards.

The network interface 160 may optionally be provided to communicate with one or more hosts or other devices (e.g., a computer, a point-of-sale terminal, a point-of-sale computer system, or a cash register). For example, data gathered by or decoded by the machine-readable symbol reader 100 may be passed along to a host computer. According to one implementation, the network interface 160 comprises a universal interface driver application-specific integrated circuit (UIDA). The network interface 160 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (PC-MCIA), or USB. A wireless connection may use low- or high-powered electromagnetic waves to transmit data using any wireless protocol, such as Bluetooth™, IEEE 802.11b (or other Wi-Fi standards), infrared data association (IrDA), and radiofrequency identification (RFID).

The machine-readable symbol reader 100 may also include one or more power supplies 162, which provide electrical power to the various components of the machine-readable symbol reader 100 via power connections.

Machine-readable symbol readers according to other implementations may have less than all of these components, may contain other components, or both. For example, the machine-readable symbol reader 100 may comprise a fixed scanner, such as an on-counter scanner or in-counter scanner, or a portable scanner, such as a handheld scanner. In addition, the machine-readable symbol reader 100 may include a radiofrequency identification (RFID) reader or interrogator and/or or a magnetic stripe reader. Such may be particularly useful when employed as a point-of-sale (POS) terminal.

After the sensor array 110 has been exposed to light reflected or otherwise returned by the object 122, data from all or a portion of the pixels can be sequentially read out in a selectable pattern (which may be row-by-row, column-by-column, or some other pattern). The pixel intensity data may optionally be converted to digital form using an analog-to-digital converter (ADC) circuit before being supplied to the controller 128. The controller 128 may include or comprise a DSP, for example, a DSP architecture such as the Blackfin® processor family from Analog Devices, Norwood, Mass., or a microcontroller, such as the high-speed ARM® processor family from ARM Ltd., Cambridge, United Kingdom. Briefly stated, the controller 128 processes the image data so as to attempt to decode a machine-readable symbol that has been focused onto the sensor array 110. The controller 128 may condition the data received from the sensor array 110 and may generate an output that generally identifies which regions of the image correspond to highly reflective or light areas, and which correspond to less reflective or dark areas, for example.

Figure 2:
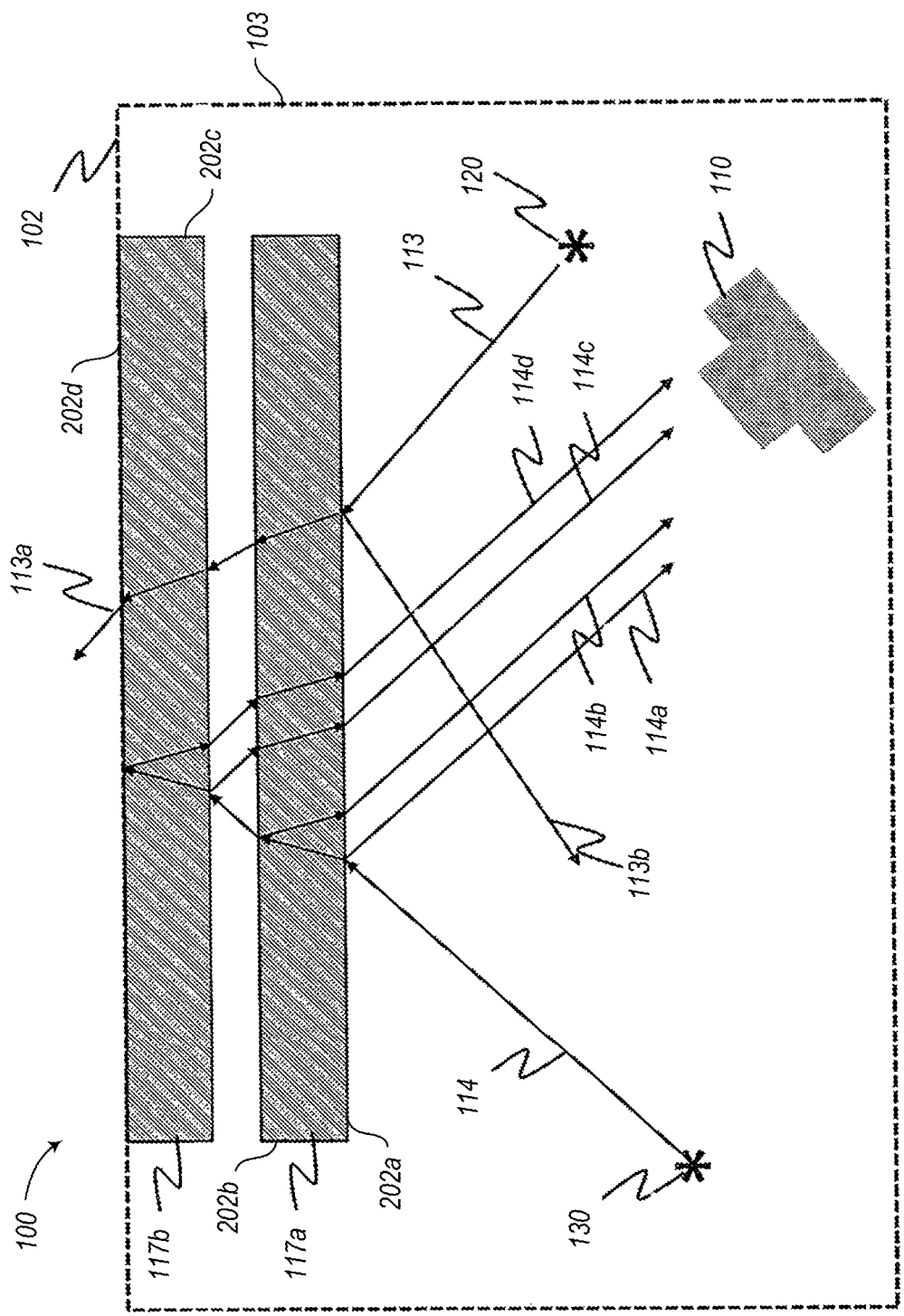
FIG. 2 is a schematic diagram showing a machine-readable symbol reader with a window having two optics positioned between an interior or inner side and an exterior or outer side of a barrier, for instance a housing, according to at least one illustrated embodiment, showing exemplary ray tracings of light transmitted through and reflected by the optics.

FIG. 2 schematically shows a portion of a data collection system or machine-readable symbol reader 100 (FIG. 1), according to one illustrated embodiment. The data collection system or machine-readable symbol reader is similar or even identical to that illustrated in FIG. 1. Thus, similar or identical structures are identified with the same reference numbers as used in FIG. 1.

The data collection system or machine-readable symbol reader 100 includes a housing 103, an imager, one or more primary illumination sources 120, and one or more secondary illumination sources 130, each received in the housing. At least a portion of the housing forms a barrier 102, and has a window 116 to allow passage of light between the interior and the exterior of the housing. As illustrated, the window 116 can include a first optic 117a and a second optic 117b. The first optic 117a is spaced relatively inwardly of the second optic 117b. The second optic is paced relatively outwardly of the first optic 117a. While two optics are illustrated, other implementation can comprise a single optic, three or even more optics.

As generally discussed, the optics 117 can take the form of transparent substrates. For example, the first or innermost optic 117a can take the form of an optically transparent or at least translucent plastic substrate. Also for example, the second or outermost optic 117b can take the form of an optically transparent or at least translucent glass substrate. Each optic 117a, 117b has an index of refraction or refractive index that is different from air. Thus, each optic 117a, 117b can be characterized as having two air-substrate interfaces.

The primary illumination source 120 is positioned on the inner side 104 of the barrier 102, e.g., in the interior of the housing 103, and oriented to pass light (illustrated by arrow 113a) through the window 116 via the at least one optic 117 without directly passing light to the imager 110 and substantially without reflection to the imager 110 from the at least one optic 117a, 117b of the window 116. As illustrated in FIG. 2, some of the light from the primary illumination source 120 may reflect back into the housing (illustrated by arrow 113b), however such does not reflect directly toward the imager 110.

The secondary illumination source 130 is positioned on the inner side 104 of the barrier 102, e.g., in the interior of the housing 103, and oriented to at least partially reflect light (arrow 114a, 114b, 114c, 114d) from various air-substrate interfaces 202a, 202b, 202c, 202d of the optics 117a, 117b of the window 116 for detection of the reflected light 114 by the imager 110.

The first optic 117a includes a first or inner air-substrate interface 202a and a second or outer air-substrate interface 202b. As illustrated, light 114 from the secondary illumination source 130 partially reflects from the first or inner air-substrate interface 202a of the first optic 117a resulting in reflected light 114a. As illustrated, light 114 from the secondary illumination source 130 partially reflects from the second or outer air-substrate interface 202b of the first optic 117a resulting in reflected light 114b.

The second optic 117b includes a first or inner air-substrate interface 202c and a second or outer air-substrate interface 202d. As illustrated, light 114 from the secondary illumination source 130 partially reflects from the first or inner air-substrate interface 202c of the second optic resulting in reflected light 114c. As illustrated, light 114 from the secondary illumination source 130 partially reflects from the second or outer air-substrate interface 202d of the second optic 117b resulting in reflected light 114d.

As previously noted, for the typical case where the optics 117a, 117b are glass and/or plastic, each reflection from an air-substrate interface will contain approximately four percent of the power of the incoming beam or light. Thus, with each reflection, the power returned is less than the previous reflection.

Figure 3:
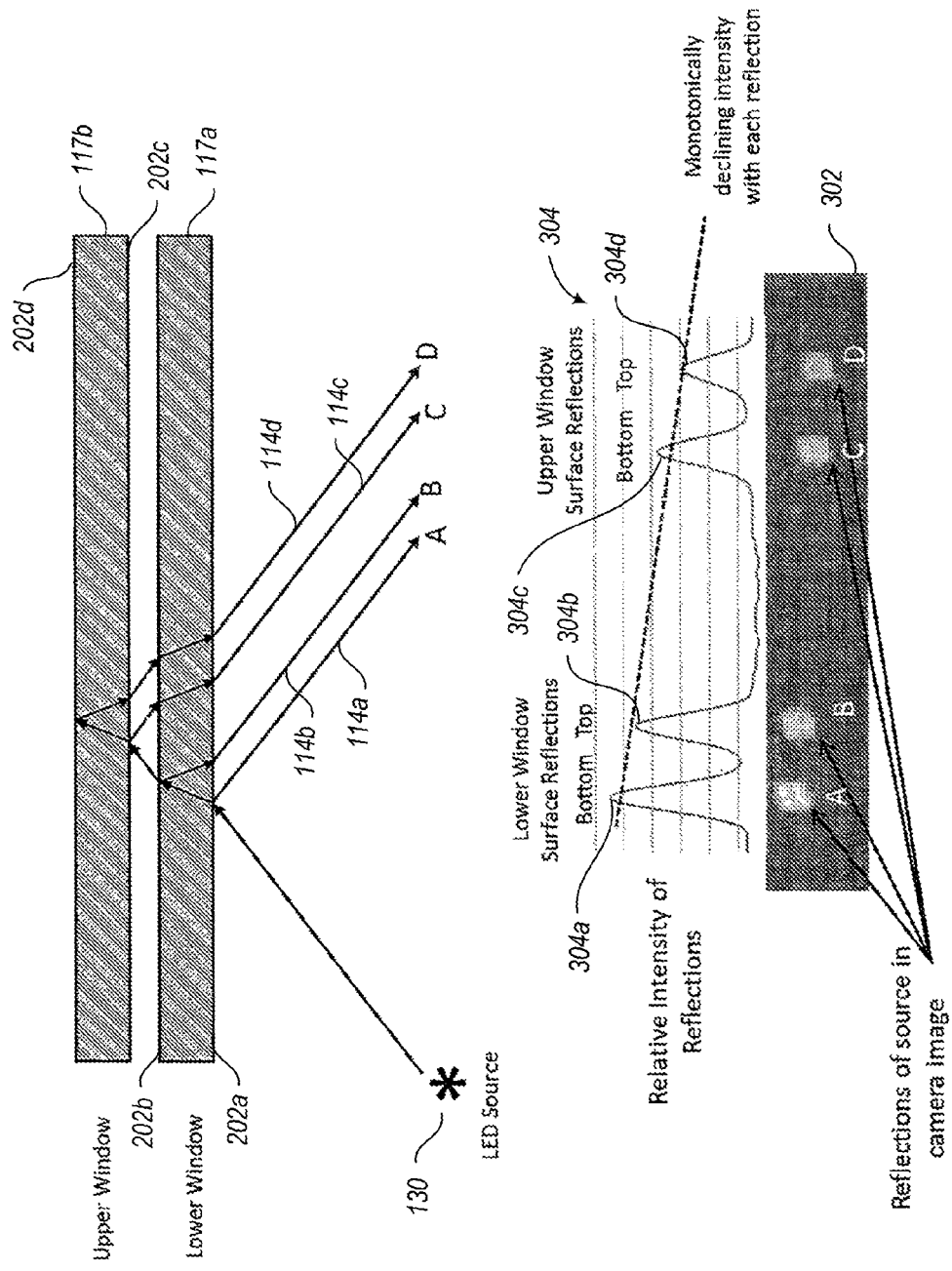
FIG. 3 is a schematic diagram showing a portion of a machine-readable symbol reader with a window having two optics, according to at least one illustrated embodiment, showing exemplary ray tracings of light reflected by the optics, and showing both an image of the reflections and a graph of the intensity of the detected image.

FIG. 3 schematically shows a portion of a data collection system or machine-readable symbol reader 100 (FIG. 1), according to one illustrated embodiment. The data collection system or machine-readable symbol reader is similar or even identical to that illustrated in FIG. 1. Thus, similar or identical structures are identified with the same reference numbers as used in FIG. 1.

FIG. 3 shows an image 302 captured by the imager 110, according to one illustrated exemplary embodiment. From the image 302, it is apparent that the intensity of the respective reflections A, B, C, D of the light from the secondary illumination source diminishes as the light passes through an increasing number of the air-substrate interfaces. The spacing of the respective reflections A, B, C, D depend on the placement of secondary illumination source 130 and imager 110, along with the specific material of the optics 117a, 117b, thickness of the optics 117a, 117b, and spacing of the optics 117a, 117b from one another and from the secondary illumination source 130 and imager 110.

FIG. 3 also shows a graph 304 which represents the intensity of light detected at respective portions of the imager. From the image 302, it is apparent that the intensity of the reflections (i.e., peaks) 304a, 304b, 304c, 304d of the light from the secondary illumination source monotonously diminishes as the light passes through an increasing number of the air-substrate interfaces.

Such can advantageously be employed to recognize a reflection pattern that is indicative of a presence or absence of a display screen in a field of view of the data collection system or machine-readable symbol reader 100.

Figure 4:
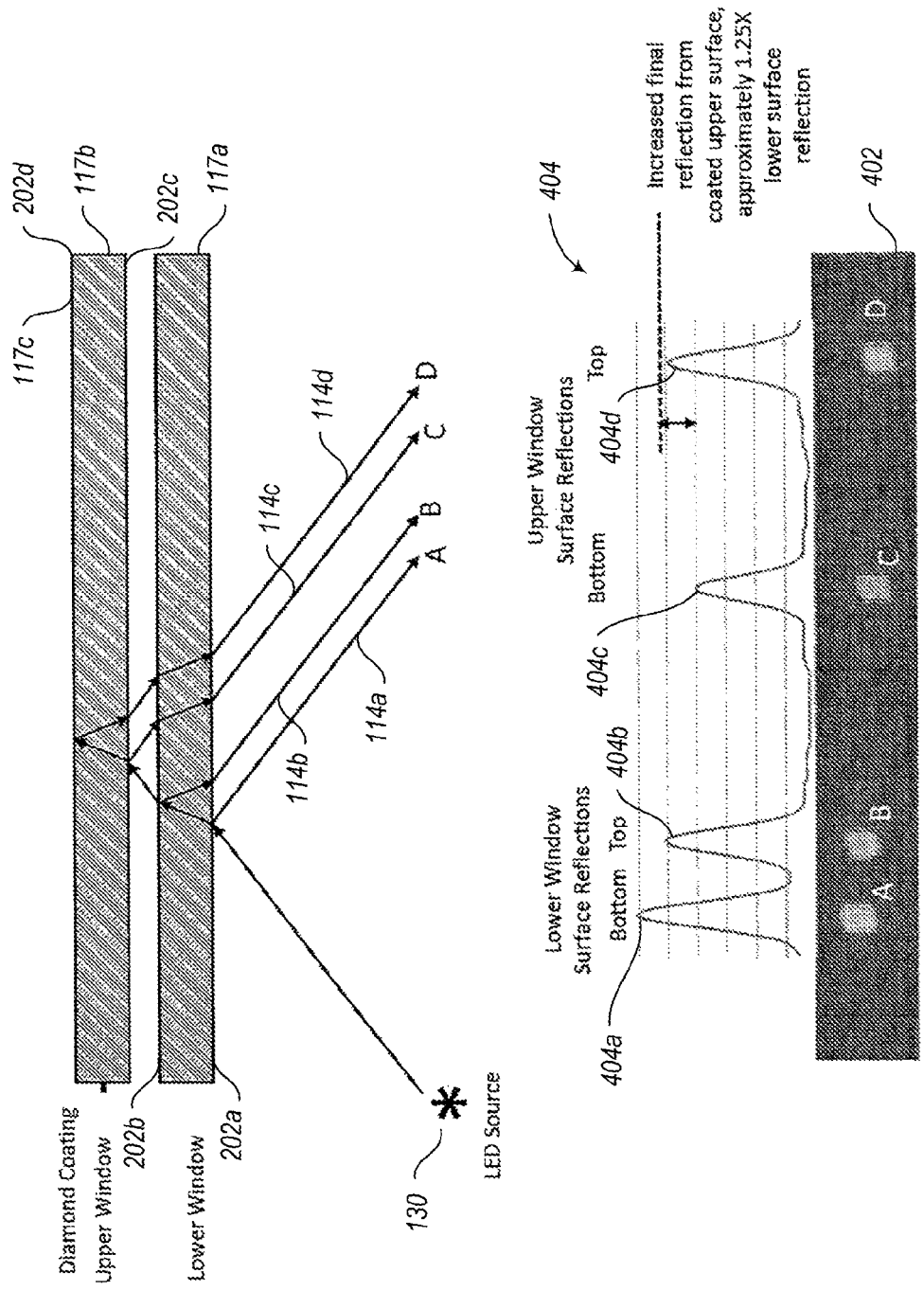
FIG. 4 is a schematic diagram showing a portion of a machine-readable symbol reader with a window having two optics, and outermost optic having a diamond—like carbon protective layer on an outer surface thereof, according to at least one illustrated embodiment, showing exemplary ray tracings of light reflected by the optics, and showing both an image of the reflections and a graph of the intensity of the detected image.

FIG. 4 schematically shows a portion of a data collection system or machine-readable symbol reader 100 (FIG. 1), according to one illustrated embodiment. The data collection system or machine-readable symbol reader is similar or even identical to that illustrated in FIG. 1. Thus, similar or identical structures are identified with the same reference numbers as used in FIG. 1.

In contrast the data collection system or machine-readable symbol reader 100 (FIG. 1), the data collection system or machine-readable symbol reader 100 (FIG. 1) employs a tough protective coating 117c on an outermost surface of an outer optic (e.g., second optic 117b). Such is common for data collection system or machine-readable symbol reader 100 mounted in countertops with windows parallel to the countertop, for example those commonly found a retail point-of-sale terminals. The protective coating 117c can, for example, take the form of a synthetic diamond or diamond-like carbon (DLC). The protective DLC coating 117c has a high refractive index, and creates a relatively large reflection. The protective coating 117c increase reflection from the second or outer air-substrate interface 202d of the second optic 117b.

FIG. 4 shows an image 402 captured by the imager 110, according to one illustrated exemplary embodiment. From the image 402, it is apparent that the intensity of the reflections A, B, C, of the light from the secondary illumination source diminishes as the light passes through an increasing number of the air-substrate interfaces, until light reaches the second or outer air-substrate interface 202d of the second optic 117b which bears the protective coating 117c. The intensity of light reflecting from the second or outer air-substrate interface 202d of the second optic 117b with the protective coating 117c is larger than that reflected from the first or inner air-substrate interface 202d of the second optic 117b.

FIG. 4 also shows a graph 404 which represents the intensity of light detected at respective portions of the imager. From the graph 404, it is apparent that the intensity of the reflections (i.e., peaks) 404a, 404b, 404c of the light from the secondary illumination source monotonously diminishes as the light passes through an increasing number of the air-substrate interfaces, until light reaches the second or outer air-substrate interface 202d of the second optic 117b which bears the protective coating 117c. In fact, the intensity of light reflecting from the second or outer air-substrate interface 202d of the second optic 117b with the protective coating 117c is approximately 1.25 times that reflected from the first or inner air-substrate interface 202d of the second optic 117b.

Such can advantageously be employed to recognize a reflection pattern that is indicative of a presence or absence of a display screen in a field of view of the data collection system or machine-readable symbol reader 100. For example, if a diffuse or specular object is placed on the window, ignoring main illumination, the poor optical flatness quality of the object will in almost all cases result in no image of reflections of the secondary illumination source 130 being captured by the imager 110.

Figure 5:
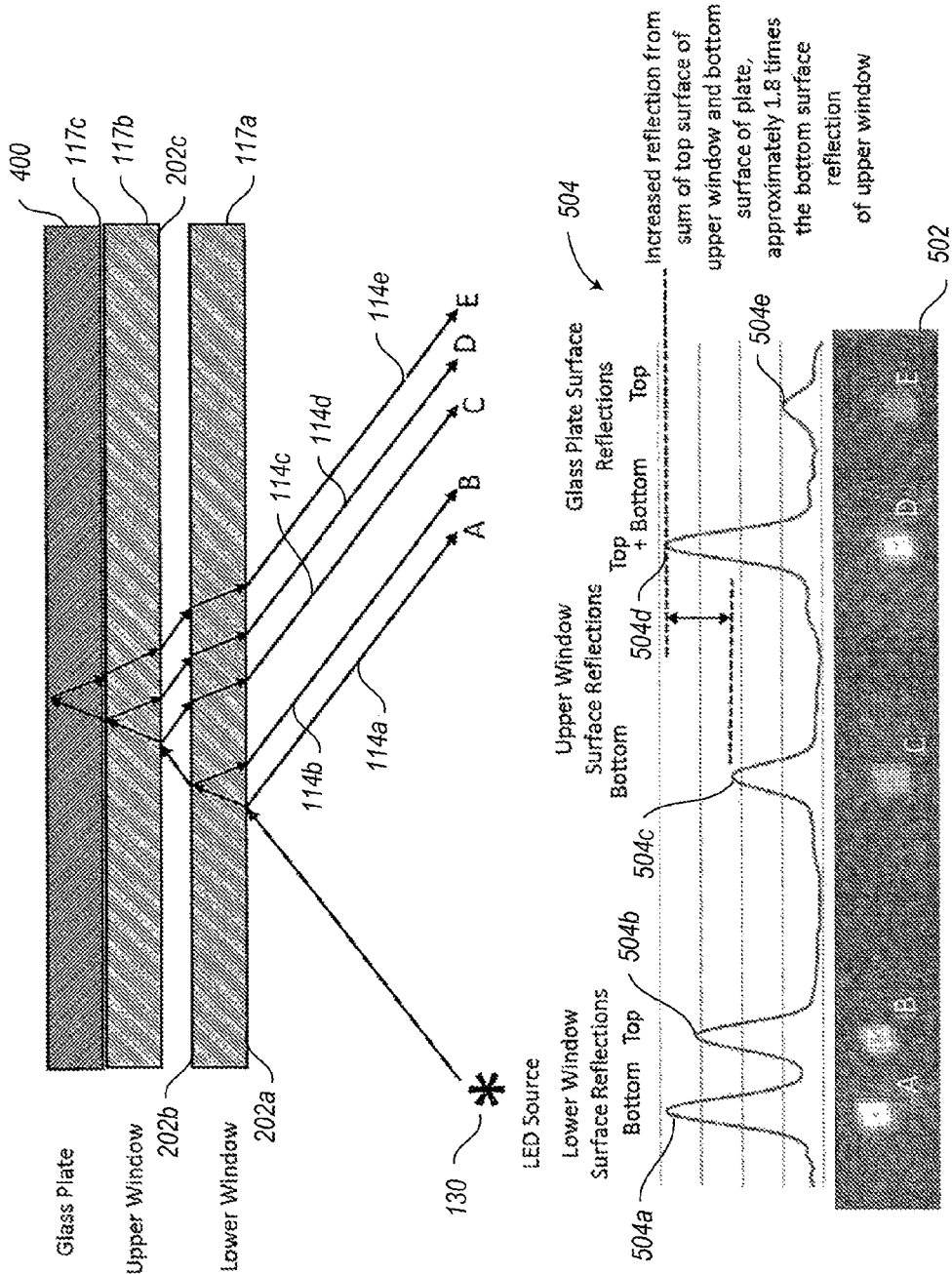
FIG. 5 is a schematic diagram showing a portion of a machine-readable symbol reader of FIG. 4, with a glass plate positioned on an exterior thereof, the glass plate representative of a display screen of certain electronic devices, according to at least one illustrated embodiment, showing exemplary ray tracings of light reflected by the optics, and showing both an image of the reflections and a graph of the intensity of the detected image.

FIG. 5 schematically shows a portion of a data collection system or machine-readable symbol reader 100 (FIG. 1), according to one illustrated embodiment, with a glass plate 500 on the window 117, similar to that of a display screen of an electronic device. The data collection system or machine-readable symbol reader is similar or even identical to that illustrated in FIG. 4. Thus, similar or identical structures are identified with the same reference numbers as used in FIG. 4.

FIG. 5 shows an image 502 captured by the imager 110, according to one illustrated exemplary embodiment. From the image 502, it is apparent that the intensity of the reflections A, B, C, of the light from the secondary illumination source diminishes as the light passes through an increasing number of the air-substrate interfaces, until light reaches the second or outer air-substrate interface 202d of the second optic 117b which bears the protective coating 117c. The presence of the glass substrate 500 adjacent the second optic matches the respective indices of refraction. The outer surface of the glass provides another air-substrate interface 202e, with a resultant reflection 114e. Notably, the intensity of light reflecting from the interface 202d between the outer surface of the second optic 117b with the protective coating 117c and the inner surface of the glass substrate 500 is larger than that reflected from the first or inner air-substrate interface 202d of the second optic 117b, and is larger than that reflected from the second or outer air-substrate interface 202d of the second optic 117b with the protective coating 117c in the absence of the glass substrate 500.

FIG. 5 also shows a graph 504 which represents the intensity of light detected at respective portions of the imager. From the graph 504, it is apparent that the intensity of the reflections (i.e., peaks) 504a, 504b, 504c, of the light from the secondary illumination source monotonously diminishes as the light passes through an increasing number of the air-substrate interfaces, until light reaches the outer surface of the second optic 117b which bears the protective coating 117c and with which the glass substrate 500 is immediately adjacent. In fact, the intensity of light reflecting from the outer surface of the second optic 117b with the protective coating 117c with the glass substrate immediately adjacent is approximately 1.8 times that reflected from the first or inner air-substrate interface 202d of the second optic 117b. Such is significantly larger than the approximately 1.25 times increase realized without the glass substrate immediately adjacent.

Such can advantageously be employed to recognize a reflection pattern that is indicative of a presence or absence of a display screen in a field of view of the data collection system or machine-readable symbol reader 100.

Figure 6:
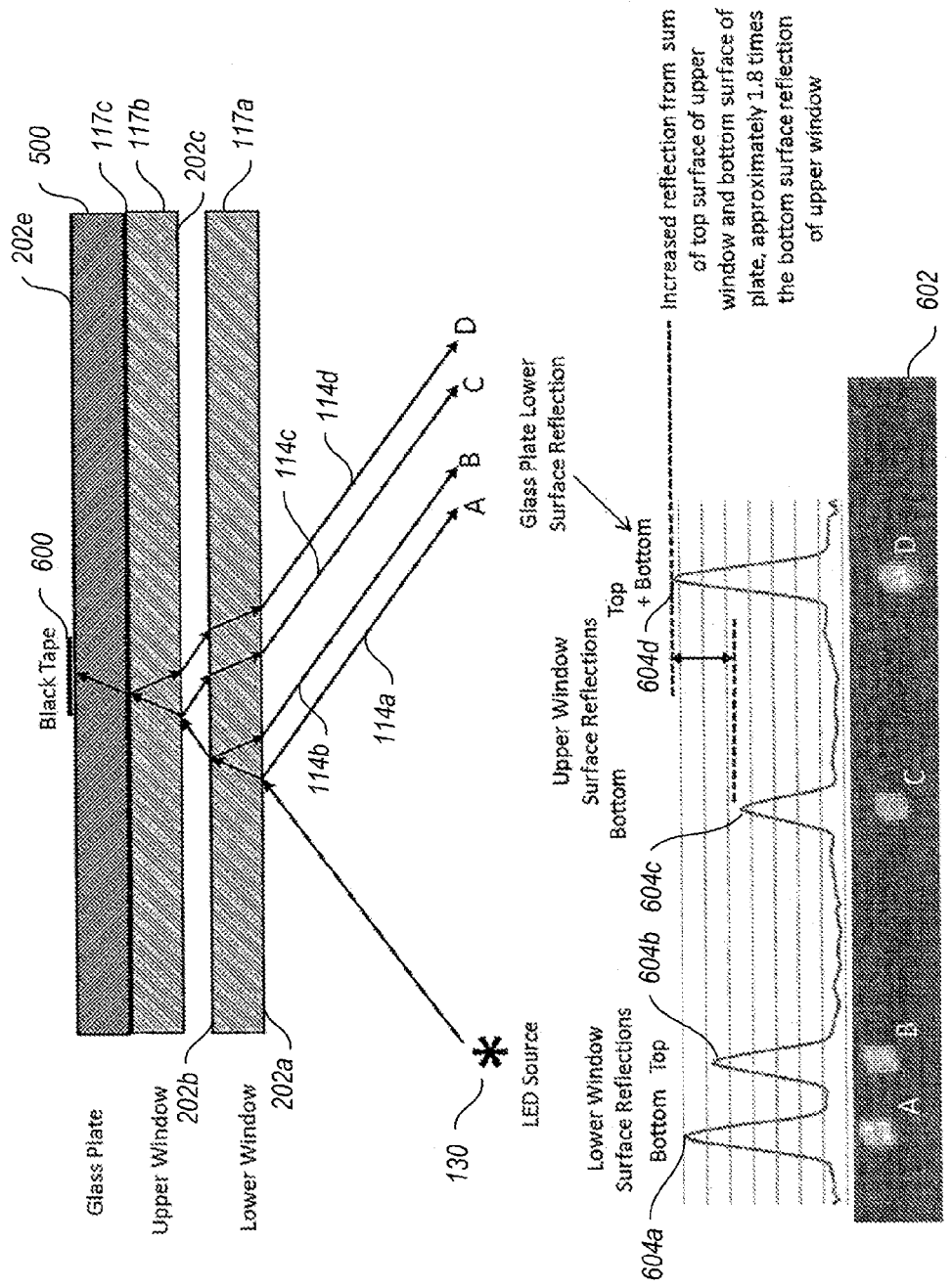
FIG. 6 is a schematic diagram showing a portion of a machine-readable symbol reader of FIG. 5, with a glass plate positioned on an exterior thereof and black tape positioned on an exterior side of the glass plate, the glass plate and black tape representative of a display screen of certain electronic devices, according to at least one illustrated embodiment, showing exemplary ray tracings of light reflected by the optics, and showing both an image of the reflections and a graph of the intensity of the detected image.

FIG. 6 schematically shows a portion of a data collection system or machine-readable symbol reader 100 (FIG. 1), according to one illustrated embodiment, with a glass plate 500 on the window 117 and black tape 600 on an outer surface of the glass plate 500. The glass plate 500 and the black tape replicates or models a display screen of certain electronic devices. The data collection system or machine-readable symbol reader is similar or even identical to that illustrated in FIG. 5. Thus, similar or identical structures are identified with the same reference numbers as used in FIG. 4.

FIG. 6 shows an image 602 captured by the imager 110, according to one illustrated exemplary embodiment. From the image 602, it is apparent that the intensity of the reflections A, B, C, of the light from the secondary illumination source diminishes as the light passes through an increasing number of the air-substrate interfaces, until light reaches the second or outer air-substrate interface 202d of the second optic 117b which bears the protective coating 117c. The presence of the glass substrate 500 adjacent the second optic matches the respective indices of refraction. The outer surface of the glass provides another air-substrate interface 202e, with a resultant reflection 114e. Notably, the intensity of light reflecting from the interface 202d between the outer surface of the second optic 117b with the protective coating 117c and the inner surface of the glass substrate 500 is larger than that reflected from the first or inner air-substrate interface 202d of the second optic 117b, and is larger than that reflected from the second or outer air-substrate interface 202d of the second optic 117b with the protective coating 117c in the absence of the glass substrate 500.

FIG. 6 also shows a graph 604 which represents the intensity of light detected at respective portions of the imager. From the graph 604, it is apparent that the intensity of the reflections (i.e., peaks) 604a, 604b, 604c, of the light from the secondary illumination source monotonously diminishes as the light passes through an increasing number of the air-substrate interfaces, until light reaches the outer surface of the second optic 117b which bears the protective coating 117c and with which the glass substrate 500 is immediately adjacent. In fact, the intensity of light reflecting from the outer surface of the second optic 117b with the protective coating 117c with the glass substrate immediately adjacent is approximately 1.8 times that reflected from the first or inner air-substrate interface 202d of the second optic 117b. Such is significantly larger than the approximately 1.25 times increase realized without the glass substrate immediately adjacent.

Such can advantageously be employed to recognize a reflection pattern that is indicative of a presence or absence of a display screen in a field of view of the data collection system or machine-readable symbol reader 100.

Operation

In actual operation, a data collection device, for instance in a machine-readable symbol reader, could have a saved quiescent ratio of D:C reflection gained at some point when there is nothing other than a dark field in the field of view. This could be obtained at time of manufacture, or preferably at regular intervals during operation or on power-up of a data collection device. This would reduce problems related to slowly changing conditions with the data collection device, for instance in a machine-readable symbol reader over time. During operation, if the controller subsystem detects that the D:C ratio is above a threshold value, the controller subsystem can place the data collection device in a reflective reading mode, characterized by longer exposure and/or lack of active illumination as compared to a diffuse reading mode.

On detecting the D:C ratio returning to below a threshold value, or after a timeout period, or based one some other criterion, the control subsystem can return operation to the diffuse reading mode, characterized by fast exposure and/or active illumination (e.g., strobe illumination via the primary illumination source(s)).

In many environments the need for reading information for display screens of electronic devices may be low frequency as compared to reading diffused labeled items. Thus, the control subsystem can perform a check for a telltale reflection ratio at the end of processing of an image frame for decoding normally diffuse labels. If there was not sufficient time to process the reflection images, this operation could be skipped, and would thus not affect normal throughput. Also, the region of interest (ROI) within which the reflection images fall is typically a small fraction of the overall image field of the imager 110, which should significantly reduce the image processing time associated with this operation.

In certain cases where, for example, the display screen of the electronic display does not lie perfectly flat on the outermost optic of the window, the reflection from the surface of the display screen may be offset, rather than superimposed with the reflection from the outermost surface of the outermost optic. In this case, merely measuring the peak intensity will not provide the correct result. With slightly more involved image processing, the reflection of the display screen could be identified in the electronic image, and qualified based upon its radial distance to the outermost optic's top reflection.

Additionally, the secondary illumination source does not need to be turned ON for every frame. The control subsystem can, for example, cycle the secondary illumination source ON and OFF at various times or frequencies. This may be advantageous for operations such as determining where the reflection images are located in the overall field of the imager by assessing image differences with the secondary illumination source alternatingly ON (i.e., emitting light) and OFF (i.e., not emitting light).

Figure 7:
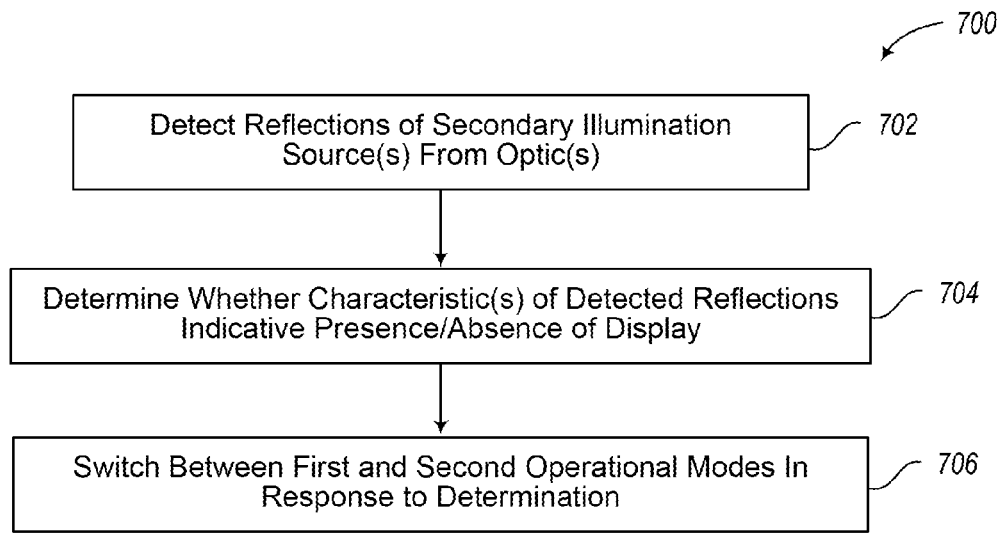
FIG. 7 is a flow diagram showing a method of imaging a machine-readable symbol, according to at least one illustrated embodiment.

FIG. 7 is a flow diagram showing a method 700 of operation in a data collection device, for instance in a machine-readable symbol reader, according to at least one illustrated embodiment.

At 702, an imager detects reflections of light emitted by the secondary illumination source(s), which light is at least partially reflected from one or more optics.

At 704, a control subsystem or controller determines whether one or more characteristics of the detected reflections are indicative of either a presence or an absence of a display screen of an electronic device in a field of view of the machine-readable symbol reader.

At 706, control subsystem or controller switches between a first and a second operational mode in response to a determination. For example, in response to a determination that a display screen is in the field of view, the control subsystem or controller can switch between a diffuse reading mode, which employs strobe illumination with fast exposure times for higher speed reading, to a reflective reading mode which turns off active illumination by the primary illumination source(s) with slower exposure times for lower speed reading.

Figure 8:
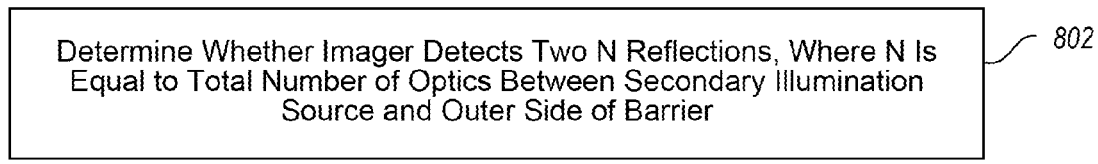
FIG. 8 is a flow diagram showing a method of imaging a machine-readable symbol, according to at least one illustrated embodiment.

FIG. 8 is a flow diagram showing a method 800 of operation in a data collection device, for instance in a machine-readable symbol reader, according to at least one illustrated embodiment. The control subsystem or controller can employ the method 800 in determining whether one or more characteristics of the detected reflections are indicative of either a presence or an absence of a display screen of an electronic device in a field of view of the machine-readable symbol reader (704, FIG. 7).

At 802, control subsystem or controller determines whether imager detects two N reflections, where N is equal to total number of optics between secondary illumination source and outer side of barrier. Notably, each optic typically has two interfaces (e.g., air-substrate interfaces), at which an angle of refraction changes. Thus, if there are two optics (i.e., N=2), 2 times N reflections are expected. A fifth reflection may be indicative of a display screen.

Figure 9:
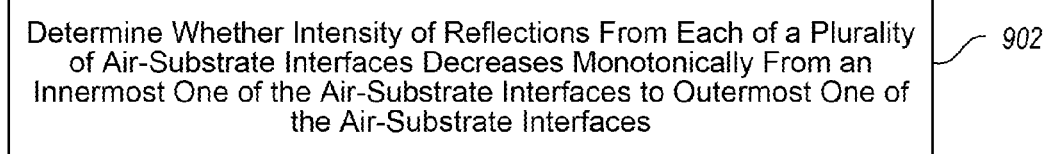
FIG. 9 is a flow diagram showing a method of imaging a machine-readable symbol, according to at least one illustrated embodiment.

FIG. 9 is a flow diagram showing a method 900 of operation in a data collection device, for instance in a machine-readable symbol reader, according to at least one illustrated embodiment. The control subsystem or controller can employ the method 800 in determining whether one or more characteristics of the detected reflections are indicative of either a presence or an absence of a display screen of an electronic device in a field of view of the machine-readable symbol reader (704, FIG. 7).

At 902, control subsystem or controller determines whether an intensity of reflections from each of a plurality of air-substrate interfaces decreases monotonically from an innermost one of the air-substrate interfaces to outermost one of the air-substrate interfaces.

Figure 10:
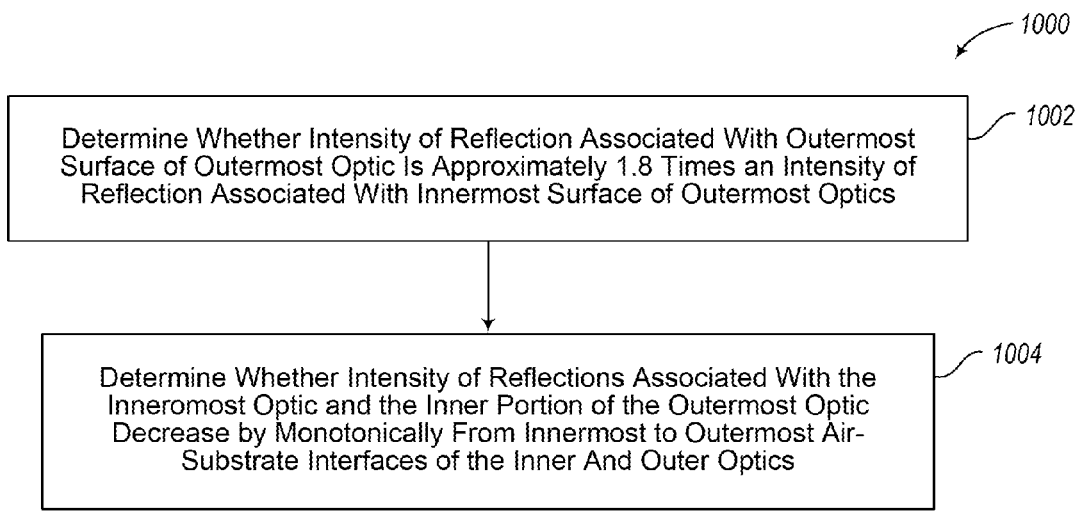
FIG. 10 is a flow diagram showing a method of imaging a machine-readable symbol, according to at least one illustrated embodiment.

FIG. 10 is a flow diagram showing a method 1000 of operation in a data collection device, for instance in a machine-readable symbol reader, according to at least one illustrated embodiment. The control subsystem or controller can employ the method 1000 in determining whether one or more characteristics of the detected reflections are indicative of either a presence or an absence of a display screen of an electronic device in a field of view of the machine-readable symbol reader (704, FIG. 7).

At 1002, a control subsystem or controller determines determine whether intensity of reflection associated with outermost surface of outermost optic is approximately 1.8 times an intensity of reflection associated with innermost surface of outermost optics.

At 1004, the control subsystem or controller determines whether intensity of reflections associated with the innermost optic and the inner portion of the outermost optic decrease by monotonically from innermost to outermost air-substrate interfaces of the inner and outer optics.

Figure 11:
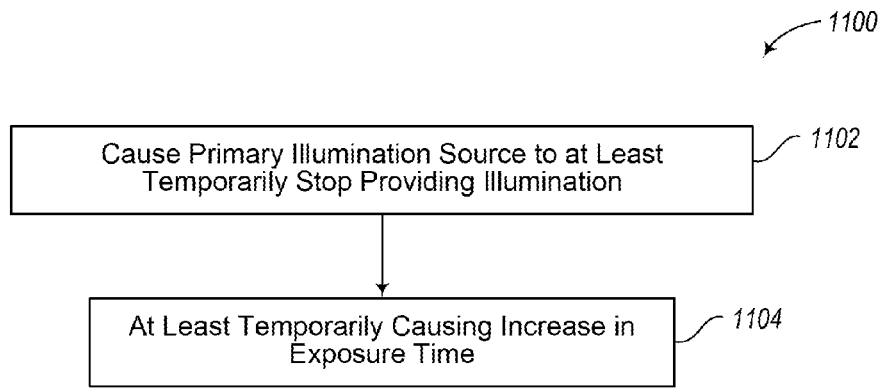
FIG. 11 is a flow diagram showing a method of imaging a machine-readable symbol, according to at least one illustrated embodiment.

FIG. 11 is a flow diagram showing a method 1100 of operation in a data collection device, for instance in a machine-readable symbol reader, according to at least one illustrated embodiment. The control subsystem or controller can employ the method 1000 in switching between a first and a second operational mode in response to determination (706, FIG. 7).

At 1102, a control subsystem or controller causes the primary illumination source(s) to at least temporarily stop providing illumination. For example, an illumination driver can send appropriate signals to the primary illumination source(s) or can operate one or more switches to selectively control a supply of power to the primary illumination source(s).

At 1104, the control subsystem or controller at least temporarily causes increase in exposure time.

Those of skill in the art will recognize that many of the methods or algorithms set out herein may employ additional acts, may omit some acts, and/or may execute acts in a different order than specified. The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A data collection system, comprising:
a barrier having an outer side, an inner side, and at least one window, the inner side of the barrier opposed across a thickness of the barrier from the outer side of the barrier, and the at least one window having at least one optic that is transparent or at least translucent and which allows light to pass through the window between the outer and the inner sides of the barrier;
at least a first imager, the first imager positioned to the inner side of the barrier to receive light that passes through the at least one window from the outer side of the barrier via the at least one optic;
at least one primary illumination source positioned on the inner side of the barrier and oriented to pass light through the at least one window via the at least one optic without directly passing light to the first imager and substantially without reflection to the first imager from the at least one optic;
at least one secondary illumination source positioned on the inner side of the barrier and oriented to direct light toward the at least one optic with partial reflection from the at least one optic to the first imager; and
a control subsystem including at least one processor, the control subsystem communicatively coupled to the imager and communicatively coupled and operable to control at least one of: the at least one primary illumination source or exposure time of the first imager responsive to at least one characteristic of a number of reflections by at least one optic of light from the at least one secondary illumination source.

2. The data collection system of claim 1 wherein the at least one optic includes a first transparent substrate.

3. The data collection system of claim 2 wherein the control subsystem determines whether the imager detects two times N reflections, where N is equal to a total number of optics between the secondary illumination source and the outer side of the barrier.

4. The data collection system of claim 3 wherein, in response to determining that there are more than two times N reflections detected, the control subsystem causes the primary illumination source to at least temporarily stop providing illumination.

5. The data collection system of claim 3 wherein, in response to determining that there are more than two times N reflections detected, the control subsystem at least temporarily causes an increase in exposure time.

6. The data collection system of claim 3 wherein, in response to determining that there are more than two times N reflections detected, the control subsystem causes the primary illumination source to at least temporarily stop providing illumination and at least temporarily causes an increase in exposure time.

7. The data collection system of claim 2 wherein the at least one optic includes a second transparent substrate.

8. The data collection system of claim 7 wherein the control subsystem determines whether an intensity of reflections from an inner one of the first or the second transparent substrates and an outer one of the first or the second transparent substrates decreases monotonically.

9. The data collection system of claim 7 wherein the control subsystem determines whether an intensity of reflections from each of a plurality of air-substrate interfaces decreases monotonically from an innermost one of the air-substrate interfaces to an outermost one of the air-substrate interfaces.

10. The data collection system of claim 7 wherein the first transparent substrate is a plastic transparent substrate and the second transparent substrate is a glass transparent substrate.

11. The data collection system of claim 10 wherein the plastic transparent substrate is spaced inwardly of the glass transparent substrate.

12. The data collection system of claim 11 wherein the glass transparent substrate includes a protective coating on an outer portion thereof.

13. The data collection system of claim 12 wherein the control subsystem determines whether an intensity of a reflection associated with the outer portion of the glass transparent substrate is approximately 1.8 times an intensity of a reflection associated with an inner portion of the glass transparent substrate.

14. The data collection system of claim 13 wherein the control subsystem further determines whether an intensity of a number of reflections associated with the plastic transparent substrate and the inner portion of the glass transparent substrate decrease by monotonically from innermost to outermost air-substrate interfaces of the plastic and glass transparent substrates.

15. The data collection system of claim 13 wherein, in response to determining that the intensity of a reflection associated with the outer portion of the glass transparent substrate is approximately 1.8 times an intensity of a reflection associated with the inner portion of the glass transparent substrate, the control subsystem causes the primary illumination source to at least temporarily stop providing illumination.

16. The data collection system of claim 13 wherein, in response to determining that the intensity of a reflection associated with the outer portion of the glass transparent substrate is approximately 1.8 times an intensity of a reflection associated with the inner portion of the glass transparent substrate, the control subsystem at least temporarily causes an increase in exposure time.

17. The data collection system of claim 13 wherein, in response to determining that the intensity of a reflection associated with the outer portion of the glass transparent substrate is approximately 1.8 times an intensity of a reflection associated with the inner portion of the glass transparent substrate, the control subsystem causes the primary illumination source to at least temporarily stop providing illumination and at least temporarily causes an increase in exposure time.

18. The data collection system of claim 13 wherein the secondary illumination source comprises at least one light emitting diode and the primary illumination source comprises a strobe light source.

19. The data collection system of claim 1 wherein the control subsystem determines whether an intensity of a reflection associated with an outermost surface of an outermost one of the optics is approximately 1.8 times an intensity of a reflection associated with an innermost surface of the outermost one of the optics.

20. A method of operation in a data collection system that includes at least one optic between an interior and an exterior of the data collection system, an imager, at least one primary illumination source, at least one secondary illumination source, and control subsystem, the method comprising:
    detecting a number of reflections of the at least one secondary illumination source from the at least one optic;
    determining, by the control system, whether at least one characteristic of the detected reflections is indicative of a presence of a display screen of an electronic device in a field-of-view of the imager of the data collection system; and
    switching, by the control system, between a first operational mode of the data collection system and a second operational mode of the data collection system in response to a determination that the at least one characteristic of the detected reflections is indicative of a presence of a display screen of an electronic device in the field-of-view of the imager of the data collection system.

21. The method of claim 20 wherein determining whether at least one characteristic of the detected reflections is indicative of a presence of a display screen of an electronic device in a field-of-view of the imager of the data collection system includes determining whether the imager detects two N reflections, where N is equal to a total number of optics between the secondary illumination source and the outer side of the barrier.

22. The method of claim 20 wherein switching between a first operational mode of the data collection system and a second operational mode of the data collection system includes causing the primary illumination source to at least temporarily stop providing illumination.

23. The method of claim 20 wherein switching between a first operational mode of the data collection system and a second operational mode of the data collection system includes at least temporarily causing an increase in exposure time.

24. The method of claim 20 wherein switching between a first operational mode of the data collection system and a second operational mode of the data collection system includes causing the primary illumination source to at least temporarily stop providing illumination and at least temporarily causing an increase in exposure time.

25. The method of claim 20 wherein determining whether at least one characteristic of the detected reflections is indicative of a presence of a display screen of an electronic device in a field-of-view of the imager of the data collection system includes determining whether an intensity of a reflection associated with an outermost surface of an outermost one of the optics is approximately 1.8 times an intensity of a reflection associated with an innermost surface of the outermost one of the optics.

26. The method of claim 20 wherein the at least one optic includes a second transparent substrate, and determining whether at least one characteristic of the detected reflections is indicative of a presence of a display screen of an electronic device in a field-of-view of the imager of the data collection system includes determining whether an intensity of reflections from an inner one of the first or the second transparent substrates and an outer one of the first or the second transparent substrates decreases monotonically.

27. The method of claim 20 wherein the at least one optic includes a second transparent substrate, and determining whether at least one characteristic of the detected reflections is indicative of a presence of a display screen of an electronic device in a field-of-view of the imager of the data collection system includes determining whether an intensity of reflections from each of a plurality of air-substrate interfaces decreases monotonically from an innermost one of the air-substrate interfaces to an outermost one of the air-substrate interfaces.

28. The method of claim 20 wherein the at least one optic includes a second transparent substrate, the first transparent substrate is a plastic transparent substrate and the second transparent substrate is a glass transparent substrate, the plastic transparent substrate is spaced inwardly of the glass transparent substrate, the glass transparent substrate includes a protective coating on an outer portion thereof, and determining whether at least one characteristic of the detected reflections is indicative of a presence of a display screen of an electronic device in a field-of-view of the imager of the data collection system includes determining whether an intensity of a reflection associated with the outer portion of the glass transparent substrate is approximately 1.8 times an intensity of a reflection associated with an inner portion of the glass transparent substrate.

29. The method of claim 28 wherein determining whether at least one characteristic of the detected reflections is indicative of a presence of a display screen of an electronic device in a field-of-view of the imager of the data collection system further includes determining whether an intensity of a number of reflections associated with the plastic transparent substrate and the inner portion of the glass transparent substrate decrease by monotonically from innermost to outermost air-substrate interfaces of the plastic and glass transparent substrates.

30. The method of claim 29 wherein switching between a first operational mode of the data collection system and a second operational mode of the data collection system includes causing the primary illumination source to at least temporarily stop providing illumination.

31. The method of claim 29 wherein switching between a first operational mode of the data collection system and a second operational mode of the data collection system includes at least temporarily causing an increase in exposure time.

32. The method of claim 29 wherein switching between a first operational mode of the data collection system and a second operational mode of the data collection system includes causing the primary illumination source to at least temporarily stop providing illumination and at least temporarily causing an increase in exposure time.

* * * * *